US009538458B2

(12) United States Patent
Park et al.

(10) Patent No.: US 9,538,458 B2
(45) Date of Patent: Jan. 3, 2017

(54) ACTIVE SCANNING METHOD AND APPARATUS

(71) Applicant: LG Electronics Inc., Seoul (KR)

(72) Inventors: Giwon Park, Anyang-si (KR); Kiseon Ryu, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 14/390,551

(22) PCT Filed: May 2, 2013

(86) PCT No.: PCT/KR2013/003822
§ 371 (c)(1),
(2) Date: Oct. 3, 2014

(87) PCT Pub. No.: WO2013/165200
PCT Pub. Date: Nov. 7, 2013

(65) Prior Publication Data
US 2015/0098358 A1    Apr. 9, 2015

Related U.S. Application Data

(60) Provisional application No. 61/641,304, filed on May 2, 2012, provisional application No. 61/641,895, filed on May 3, 2012, provisional application No. 61/646,375, filed on May 14, 2012.

(51) Int. Cl.
| | |
|---|---|
| *H04L 12/28* | (2006.01) |
| *H04B 7/00* | (2006.01) |
| *H04W 48/16* | (2009.01) |
| *H04W 48/10* | (2009.01) |

(Continued)

(52) U.S. Cl.
CPC ............ *H04W 48/16* (2013.01); *H04W 48/10* (2013.01); *H04W 48/14* (2013.01); *H04W 84/12* (2013.01)

(58) Field of Classification Search
CPC ...... H04W 48/16; H04W 48/10; H04W 48/12; H04W 84/12
See application file for complete search history.

(56) References Cited

U.S. PATENT DOCUMENTS

| | | | | |
|---|---|---|---|---|
| 2002/0060995 | A1* | 5/2002 | Cervello | H04W 72/02 370/332 |
| 2012/0155350 | A1* | 6/2012 | Wentink | H04W 8/005 370/311 |
| 2013/0095768 | A1* | 4/2013 | Sinha | H04W 48/16 455/70 |

FOREIGN PATENT DOCUMENTS

| | | |
|---|---|---|
| KR | 10-2006-0031867 A | 4/2006 |
| KR | 10-2009-0055150 A | 6/2006 |
| KR | 10-2011-0085836 A | 7/2011 |

(Continued)

*Primary Examiner* — Lonnie Sweet
(74) *Attorney, Agent, or Firm* — Dentons US LLP

(57) ABSTRACT

The present invention relates to an active scanning method and apparatus. The method of performing scanning in a wireless local area network (WLAN) includes: a step of a scanning station generating scan request information so as to order active scanning; a step of the scanning station receiving a scanning frame from the station; and a step of the scanning station transmitting a probe request frame in order to perform the active scanning in case the received scanning frame does not include any of the elements that are ordered in the scan request information. Accordingly, scanning procedures can be performed quickly.

6 Claims, 15 Drawing Sheets

(51) Int. Cl.
  *H04W 48/14* (2009.01)
  *H04W 84/12* (2009.01)

(56) References Cited

FOREIGN PATENT DOCUMENTS

KR 10-2012-0024425 A 3/2012
WO 2008147130 A2 12/2008

* cited by examiner (A)

(B)

ACTIVE SCANNING METHOD AND APPARATUS

This Application is a 35 U.S.C. §371 National Stage entry of International Application No. PCT/KR2013/003822, filed May 2, 2013, which claims benefit of Provisional Application No. 61/641,304 filed May 2, 2012; 61/641,895 filed May 3, 2012; and 61/646,375 filed May 14, 2012, all of which are incorporated by reference in their entirety herein.

BACKGROUND OF THE INVENTION

Field of the Invention

The present invention relates to a scanning method and apparatus of an STA, and more specifically, to a method and apparatus of an STA performing active scanning.

Related Art

Wireless LAN techniques are nowadays evolving largely in three directions. In line with the existing wireless LAN evolution, an effort to further accelerate transmission rate includes IEEE (Institute of Electrical and Electronic Engineers) 802.11ac and IEEE 802.11ad. IEEE 802.11ad is a wireless LAN technique that adopts a 60 GHz band. Further, a broadband wireless LAN technique is highlighted to allow for a wider area of transmission as compared with the existing WLAN technology, and this technique employs a frequency band of 1 GHz or less, which includes IEEE 802.11af using the TVWS (TV white space) band and IEEE 802.11ah using a 900 MHz band. These technologies are primarily oriented towards expansion of extended range Wi-Fi services as well as smart grid and wide area sensor networks. Moreover, the conventional WLNA MAC (medium access control) techniques sometimes suffer from a delayed initial link setup time. In order to address such issue to enable quick access of an STA to an AP, brisk activities to standardize IEEE 802.11ai are recently underway.

IEEE 802.11ai is an MAC technology to treat a quick authentication procedure for remarkably saving the initial setup and association time of WLAN, and its standardization dates back to January, 2011 with a regular task group. In order for a quick access procedure, IEEE 802.11ai is in discussion for simplification of processes in light of AP discovery, network discovery, TSF sync (time synchronization function synchronization), authentication & association, and merge with higher layers in process. Among others, process merge utilizing piggyback of DHCP (dynamic host configuration protocol), optimization of full EAP (extensible authentication protocol) using concurrent IP, and efficient selective AP (access point) scanning or other ideas are in vigorous discussion.

SUMMARY OF THE INVENTION

An object of the present invention is to provide an active scanning method.

Another object of the present invention is to provide an apparatus that performs active scanning.

To achieve the above-described objects of the present invention, according to an aspect of the present invention, a method of performing scanning in a wireless LAN system may comprise generating scan request information for a scanning station to indicate active scanning; receiving a scanning frame from a station by the scanning station; and when the received scanning frame does not include at least one element the same as an element indicated by the scan request information, transmitting a probe request frame to perform the active scanning by the scanning station. The scan request information may include at least one of: a BSSID (basic service set identifier) element indicating a specific BSSID or a wild card BSSID; an SSID (service set identifier) element indicating a required SSID or a wild card SSID; a probe delay element indicating a delay used before transmitting the probe request frame during the active scanning; and a request parameter element used to determine whether a responding station transmits a probe response frame in response to the probe request frame. The request parameter element may include a report request field indicating information of other BSS requested to be included in the probe response frame; a delay criteria field indicating a delay type that applies to a response to the probe request frame; and a max delay limit indicating a maximum access delay in the delay type indicated by the delay criteria field.

To achieve the above-described objects of the present invention, according to an aspect of the present invention, a wireless device of scanning a station, the wireless device including a processor, the processor may be configured to: generate scan request information for a scanning station to indicate active scanning; receive a scanning frame from a station by the scanning station; and when the received scanning frame does not include at least one element the same as an element indicated by the scan request information, transmit a probe request frame to perform the active scanning by the scanning station. The scan request information may include at least one of: a BSSID (basic service set identifier) element indicating a specific BSSID or a wild card BSSID; an SSID (service set identifier) element indicating a required SSID or a wild card SSID; a probe delay element indicating a delay used before transmitting the probe request frame during the active scanning; and a request parameter element used to determine whether a responding station transmits a probe response frame in response to the probe request frame. The request parameter element may include: a report request field indicating information of other BSS requested to be included in the probe response frame; a delay criteria field indicating a delay type that applies to a response to the probe request frame; and a max delay limit indicating a maximum access delay in the delay type indicated by the delay criteria field.

The scanning procedure may be swiftly performed.

DESCRIPTION OF EXEMPLARY EMBODIMENTS

Figure 1:
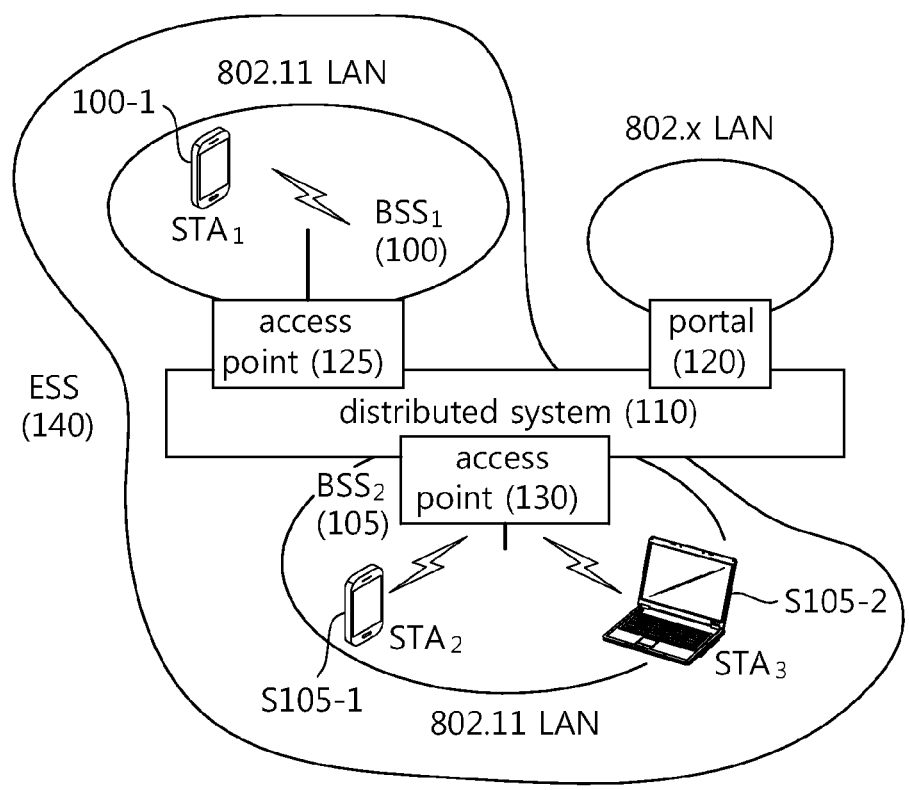
FIG. 1 is a concept view illustrating the structure of a wireless local area network (WLAN).
Figure 1:
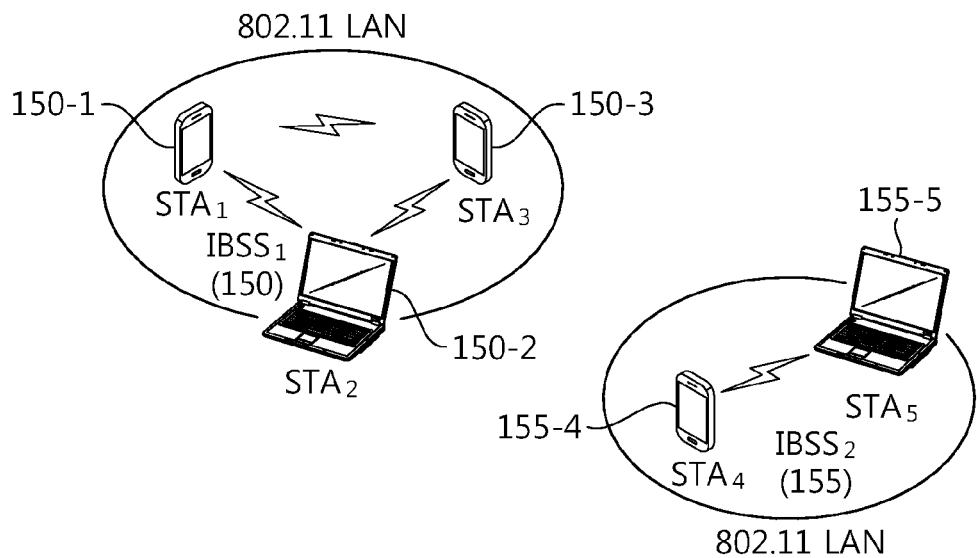

FIG. 1 is a concept view illustrating the structure of a wireless local area network (WLAN).

FIG. 1(A) shows the structure of the IEEE (institute of electrical and electronic engineers) 802.11 infrastructure network.

Referring to FIG. 1(A), the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more connectable STAs 105-1 and 105-2.

The infrastructure BSS may include at least one STA, Aps 125 and 130 providing a distribution service, and a distribution system (DS) 110 connecting multiple Aps.

The distribution system 110 may connect a number of BSSs 100 and 105 to implement an extended service set 140. The ESS 140 may be used as a term to denote one network configured as one or more Aps 125 and 230 are connected via the distribution system 110. The Aps included in one ESS 140 may have the same SSID (service set identification).

The portal 120 may function as a bridge that performs connection the WLAN network (IEEE 802.11) with other network (for example, 802.X).

In the infrastructure network as shown in FIG. 1(A), networks may be implemented between the APs 125 and 130 and between the APs 125 and 130 and the STAs 100-1, 105-1, and 105-2. However, without the APs 125 and 130, a network may be established between the STAs to perform communication. The network that is established between the STAs without the APs 125 and 130 to perform communication is defined as ad-hoc network or independent BSS (basic service set).

FIG. 1(B) is a concept view illustrating an independent BSS.

Referring to FIG. 1(B), the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all the STAs 150-1, 150-2, 150-3, 155-1, and 15502 may be mobile STAs, and access to the distribution system is not allowed so that the IBSS is a self-contained network.

The STA is some functional medium that includes the medium access control (MAC) following the IEEE (Institute of Electrical and Electronics Engineers) 802.11 standards and the physical layer interface for radio media and may be generally used as the concept including both AP and non-AP STA (station).

The STA may be referred to by various terms such as mobile terminal, wireless device, wireless transmit/receive unit (WTRU), user equipment (UE), mobile station (MS), mobile subscriber unit, or simply user.

Figure 2:
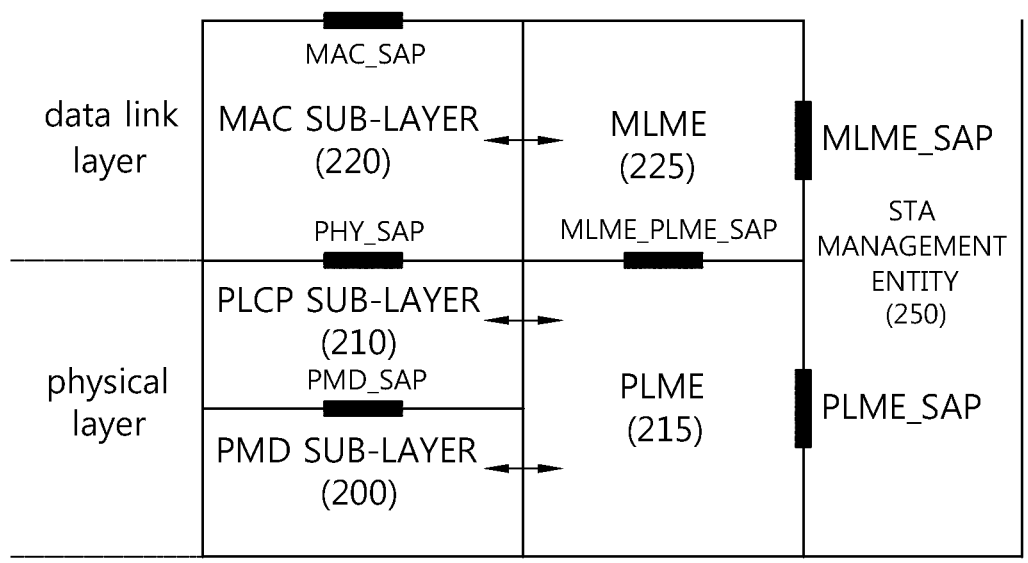
FIG. 2 is a view illustrating the layer architecture of a WLAN system supported by IEEE 802.11.

FIG. 2 is a view illustrating the layer architecture of a WLAN system supported by IEEE 802.11.

FIG. 2 conceptually shows the layer architecture (PHY architecture) of the WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented to be able to operate with the MAC sub-layer 220 least dependent upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include a management entity.

The management entity of the MAC sub-layer 220 is denoted MLME (MAC layer management entity, 225), and the management entity of the physical layer is denoted PLME (PHY layer management entity, 215). Such management entities may offer an interface where a layer management operation is conducted. The PLME 215 is connected with the MLME 225 to be able to perform management operation on the PLCP sub-layer 210 and the PMD sub-layer 200, and the MLME 225 is also connected with the PLME 215 to be able to perform management operation on the MAC sub-layer 220.

There may be an SME (STA management entity, 250) to perform correct MAC layer operation. The SME 250 may be operated as a layer independent component. The MLME, PLME, and SME may communicate information between the mutual components based on primitive.

The operation of each sub-layer is briefly described below. The PLCP sub-layer 110 delivers the MPDU (MAC protocol data unit) received from the MAC sub-layer 220 according to an instruction of the MAC layer between the MAC sub-layer 220 and the PMD sub-layer 200 to the PMD sub-layer 200 or delivers the frame from the PMD sub-layer 200 to the MAC sub-layer 220. The PMD sub-layer 200 is a PLCP sub-layer and may communicate data between a plurality of STAs by way of a radio medium. The MPDU (MAC protocol data unit) delivered from the MAC sub-layer 220 is denoted PSDU (Physical Service Data Unit) in the PLCP sub-layer 210. The MPDU is similar to the PSDU but in case an A-MPDU (aggregated MPDU), which is obtained by aggregating a plurality of MPDUs, has been delivered, the individual MPDUs may differ from the PSDU.

The PLCP sub-layer 210 adds an additional field including necessary information by the physical layer transceiver while receiving the PSDU from the MAC sub-layer 220 and delivering the same to the PMD sub-layer 200. At this time, the added field may include a PLCP preamble to the PSDU, a PLCP header, and tail bits necessary to return the convolution encoder to zero state. The PLCP preamble may play a role to allow the receiver to prepare for syncing function and antenna diversity before the PSDU is transmitted. The data field may include padding bits to the PSDU, a service field including a bit sequence to initialize the scrambler, and a coded sequence in which a bit sequence added with tail bits has been encoded. At this time, as the encoding scheme, one of BCC (Binary Convolutional Coding) encoding or LDPC (Low Density Parity Check) encoding may be selected depending on the encoding scheme supported in the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to the receiving station via the PMD sub-layer 200, and the receiving station receives the PPDU and obtains information necessary for data restoration from the PLCP preamble and PLCP header to restore the same.

Figure 3:
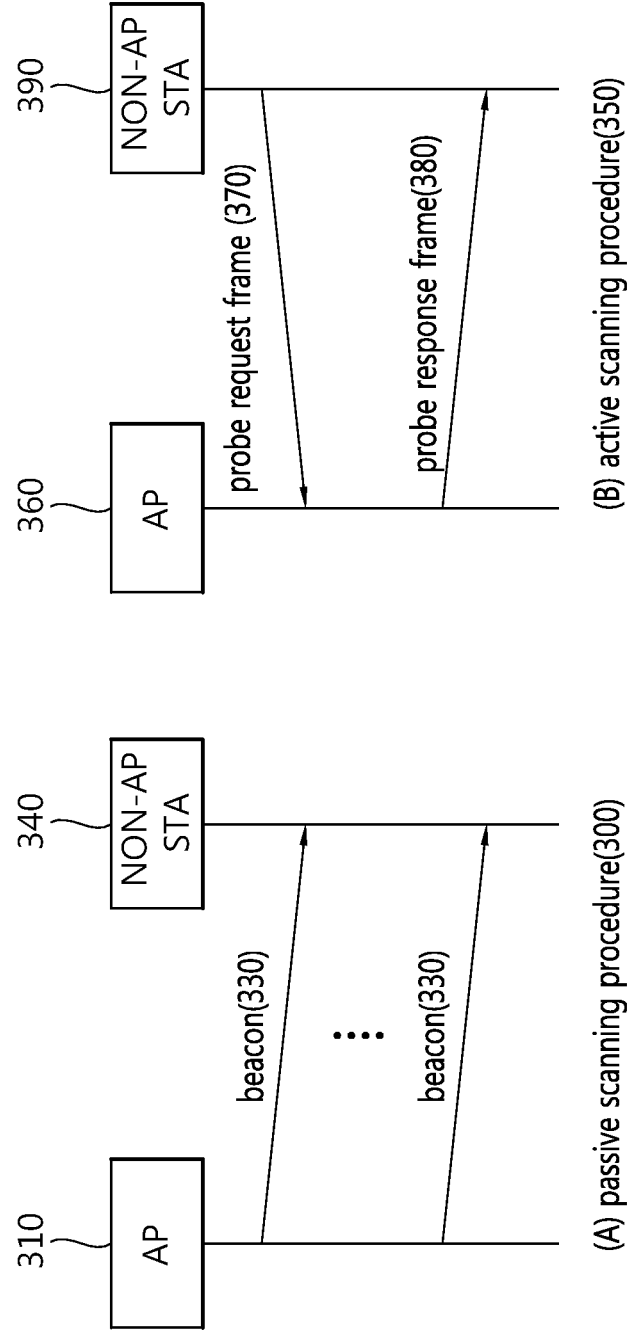
FIG. 3 is a concept view illustrating a scanning method in a WLAN.

FIG. 3 is a concept view illustrating a scanning method in a WLAN.

Referring to FIG. 3, the scanning method may be divided into passive scanning 300 and active scanning 350.

Referring to FIG. 3(A), the passive scanning 300 may be performed by a beacon frame 330 that is periodically broadcast from the AP 300. The AP 300 in the WLAN broadcasts the beacon frame 330 to the non-AP STA 340 at a particular period (e.g., per 100 msec). The beacon frame 330 may contain information on the current network. The non-AP STA 340 may perform scanning on the channel and the AP 310 to perform the authentication/association process by receiving the beacon frame 330 periodically broadcast to receive network information.

The passive scanning method 300 receives only the beacon frame 330 transmitted from the AP 310 without the need for the non-AP STA 340 to transmit a frame. Accordingly, the passive scanning 300 is advantageous of reduced entire overhead that is created upon data transmission/reception over the network. However, since the scanning cannot but be passively performed in proportion to the period of the beacon frame 330, the time taken to perform scanning may be increased. The details of the beacon frame are set forth in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, IEEE 802.11)' 8.3.3.2 beacon frame disclosed on November, 2011. IEEE 802.11ai may additionally use other format of a beacon frame, which may be referred to as FILS (fast initial link setup) beacon frame. Further, the measurement pilot frame is a frame containing only some information of the beacon frame, which may be used in the scanning procedure. The measurement pilot frame is set forth in IEEE 802.11 8.5.8.3 measurement pilot format.

Referring to FIG. 3(B), the active scanning 350 refers to a method in which the non-AP STA 390 leads scanning by transmitting a probe request frame 370 to the AP 360.

After receiving the probe request frame 370 from the non-AP STA 390, the AP 360 may wait a random time to prevent frame collision and then includes network information in a frame response frame 380, then sending the same to the non-AP STA 390. The non-AP STA 390 may obtain the network information based on the received probe response frame 380 and may pause the scanning process.

The active scanning 350 lets the non-AP STA 390 play a leading role in the scanning and thus is advantageous of a short scanning time. However, the non-AP STA 390 should transmit the probe request frame 37, resulting in an increase in the network overhead for frame transmission and reception. The probe request frame 370 is set forth in IEEE 802.11 Ch. 8.3.3.9, and the probe response frame 380 is set forth in IEEE 802.11 Ch. 8.3.3.10.

After the scanning, the AP and the STA may conduct the authentication and association procedures.

Figure 4:
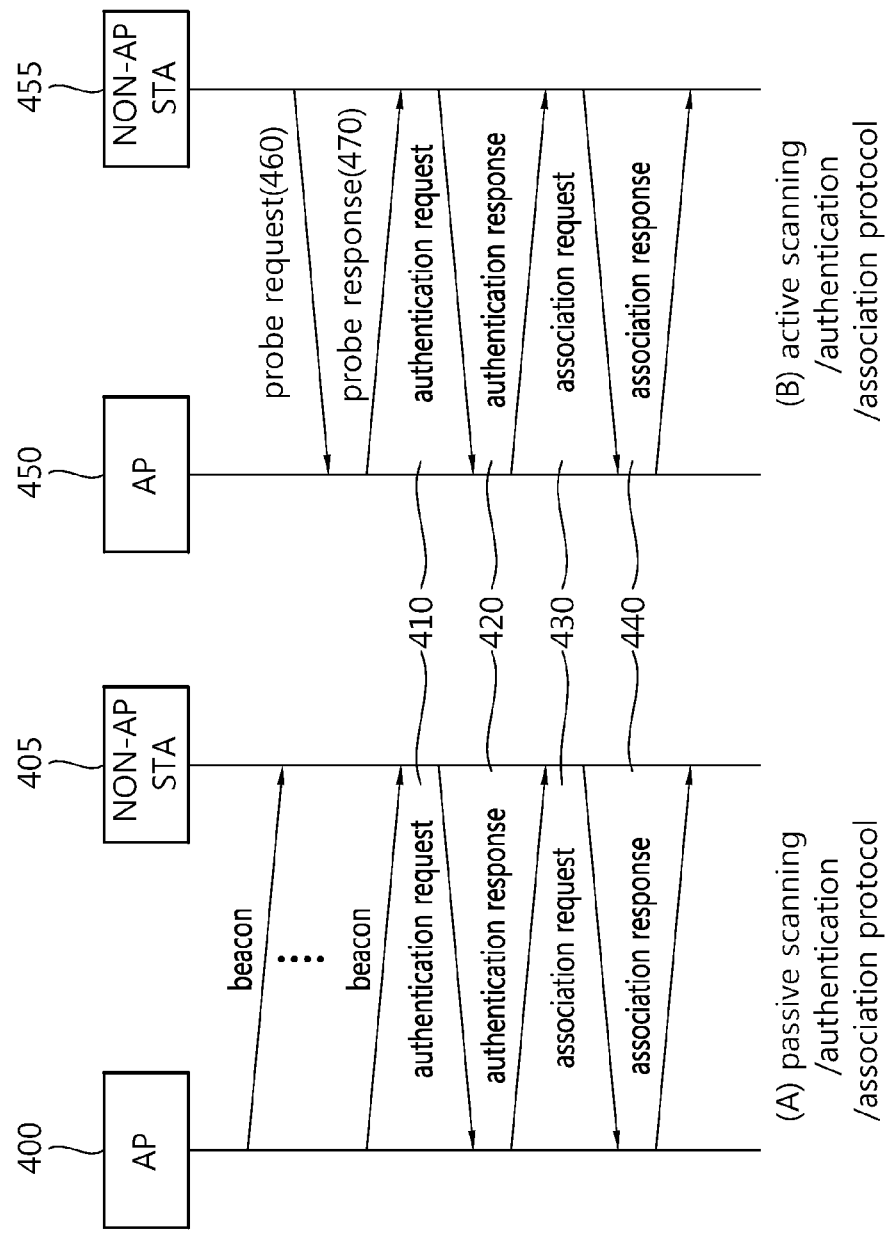
FIG. 4 is a concept view illustrating an authentication and association process after scanning, which is performed by an AP and an STA.

FIG. 4 is a concept view illustrating an authentication and association process after scanning, which is performed by an AP and an STA.

Referring to FIG. 4, after passive/active scanning, the authentication and association may be conducted with one of the scanned APs.

The authentication and association process may be carried out by way of, e.g., 2-way handshaking. FIG. 4(A) is a concept view illustrating the authentication and association process after passive scanning, and FIG. 4(B) is a concept view illustrating an authentication and association after active scanning.

The authentication and association may be equally performed by exchanging an authentication request frame 410/authentication response frame 420 and an association request frame 330/association response frame 440 between the AP 400 or 450 and the non-AP STA 405 or 455 regardless of which one of the active scanning method and the passive scanning method has been used.

The authentication process may be conducted by transmitting the authentication request frame 410 from the non-AP STA 405 or 455 to the AP 400 or 450. In response to the authentication request frame 410, the authentication response frame 420 may be transmitted from the AP 400 or 450 to the non-AP STA 405 or 455. The authentication frame format is set forth in IEEE 802.11 Ch. 8.3.3.11.

The association process may be performed by transmitting the association request frame 430 from the non-AP STA 405 or 455 to the AP 400 or 405. In response to the association request frame 430, the association response frame 440 may be transmitted from the AP 405 or 455 to the non-AP STA 400 or 450. The transmitted association request frame 430 contains information on the capability of the non-AP STA 405 or 455. Based on the information on the capability of the non-AP STA 405 or 455, the AP 400 or 350 may determine whether it is possible to support the non-AP STA 405 or 355. In case the support is possible, the AP 300 or 450 may include in the association response frame 440 whether to accept the association request frame 440 and its reason and its supportable capability information and send the same to the non-AP STA 405 or 455. The association frame format is set forth in IEEE 802.11 Chs. 8.3.3.5/8.3.3.6.

After the association step is performed, normal data transmission and reception is carried out. Unless the association is performed, the association is re-performed based on the cause of not performing the association or association to other AP may be performed.

Figure 5:
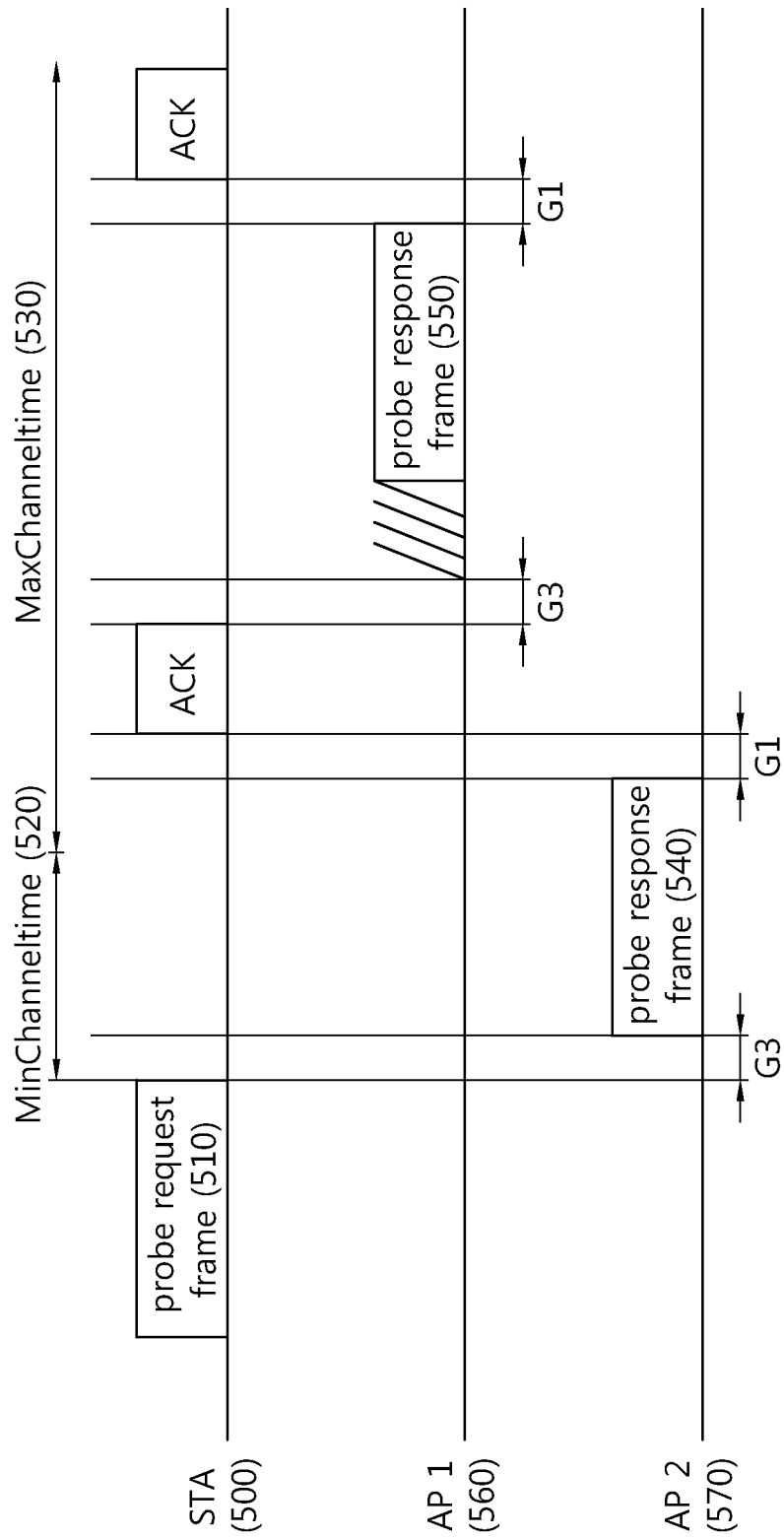
FIG. 5 is a concept view illustrating an active scanning procedure.

FIG. 5 is a concept view illustrating an active scanning procedure.

Referring to FIG. 5, the active scanning procedure may be performed in the following steps.

(1) It is determined whether the STA 500 is ready to perform the scanning procedure.

The STA 500 may wait, e.g., until the probe delay time expires or particular signaling information (for example, PHY-RXSTART.indication primitive) is received to perform active scanning.

The probe delay time is a delay that occurs before the STA 500 sends a probe request frame 510 when performing active scanning. PHY-RXSTART.indication primitive is a signal that is transmitted from the physical (PHY) layer to the local MAC (medium access control) layer. PHY-RX-START.indication primitive may signal information indicating that the PLCP (physical layer convergence protocol) has received a PPDU (PLCP protocol data unit) including a valid PLCP header to the MAC layer.

(2) Basic access is performed.

In the 802.11 MAC layer, a number of STAs may share a radio medium using a distributed coordination function (DCF) that is a contention-based function. The DCF may prevent collision between STAs through a back-off scheme using the carrier sense multiple access/collision avoidance (CSMA/CA) as its access protocol. The STA 500 may transmit the probe request frame 510 to the APs 560 and 570 using a basic access method.

(3) Information for specifying the APs 560 and 570 included in MLME-SCAN.request primitive (for example, SSID (service set identification) 및 BSSID (basic service set identification) information) in the probe request frame 510 and transmit the same.

The BSSID may have a value corresponding to the MAC address of the AP as an indicator to specify the AP. The SSID (service set identification) is a network term for specifying an AP, which may be read by a person who operates the STA. The BSSID and/or SSID may be used to specify an AP.

The STA 500 may specify an AP based on the information to specify the APs 560 and 570 included by MLME-SCAN.request primitive. The specified APs 560 and 570 may send the probe response frames 550 and 550 to the STA 500. The STA 500 may include the SSID and BSSID information in the probe request frame 510 and send the same to unicast, multicast, or broadcast the probe request frame 510. A method of unicasting, multicasting, or broadcasting the probe request frame 510 using the SSID and BSSID information is further described with reference to FIG. 5.

For example, in case an SSID list is included in MLME-SCAN.request primitive, the STA 500 may include the SSID list in the probe request frame 510 and transmit the same. The APs 560 and 570 may receive the probe request frame 510, determine the SSIDs included in the SSID list contained in the received probe request frame 510, and determine whether to send the probe response frames 550 and 550 to the STA 200.

(4) A probe timer is initialized as 0 and is then operated.

The probe timer may be used to check a minimum channel time (MinChanneltime, 520) and a maximum channel time (MaxChanneltime, 530). The minimum channel time 520 and the maximum channel time 530 may be used to control the active scanning operation of the STA 500.

The minimum channel time 520 may be used to perform the operation for varying the channel for conducting active scanning. For example, in case the STA 500 fails to receive the probe response frames 550 and 550 until the minimum channel time 520, the STA 500 shifts scanning channels to perform scanning at other channel. In case the STA 500 receives the probe response frame 550 until the minimum channel time 520, it may process the probe response frames 550 and 550 that are received after waiting until the maximum channel time 530.

The STA 500 may detect PHY-CCA.indication primitive until the probe timer reaches the minimum channel time 520 and may determine whether other frame (for example, probe response frames 550 and 550) has been received by the STA 500 until before the minimum channel time 520.

PHY-CCA.indication primitive may transmit information on the state of the medium from the physical layer to the MAC layer. PHY-CCA.indication primitive may indicate the state of the current channel using channel state parameters such as busy when the channel is unavailable and idle when the channel is available. The STA 500 may determine that there are probe response frames 550 and 550 received by the STA 500 when PHY-CCA.indication is detected to be busy and may determine that there are no probe response frames 550 and 550 received by the STA 500 when PHY-CCA.indication is detected to be idle.

In case PHY-CCA.indication is detected to be idle, the STA 500 may set an NAV (net allocation vector) as 0 and scan a next channel. In case PHY-CCA.indication is detected to be busy, the STA 500 may perform a process on the probe response frames 550 and 550 received after the probe timer reaches the maximum channel time 530. After process on the received probe response frames 550 and 550, the STA 500 may set the NAV (net allocation vector) as 0 and then scan a next channel.

Hereinafter, in embodiments of the present invention, determining whether there are probe response frames 550 and 550 received by the STA 500 may include meaning that the channel state is determined using PHY-CCA.indication primitive.

(5) In case all the channels included in the channel list (ChannelList) are scanned, the MLME may signal MLME-SCAN.confirm primitive. MLME-SCAN.confirm primitive may contain BSSDescriptionSet including all the information obtained in the scanning process.

In case the STA 500 uses the active scanning method, it should perform monitoring to determine whether the parameter of PHY-CCA.indication is busy until the probe timer reaches the minimum channel time.

Figure 6:
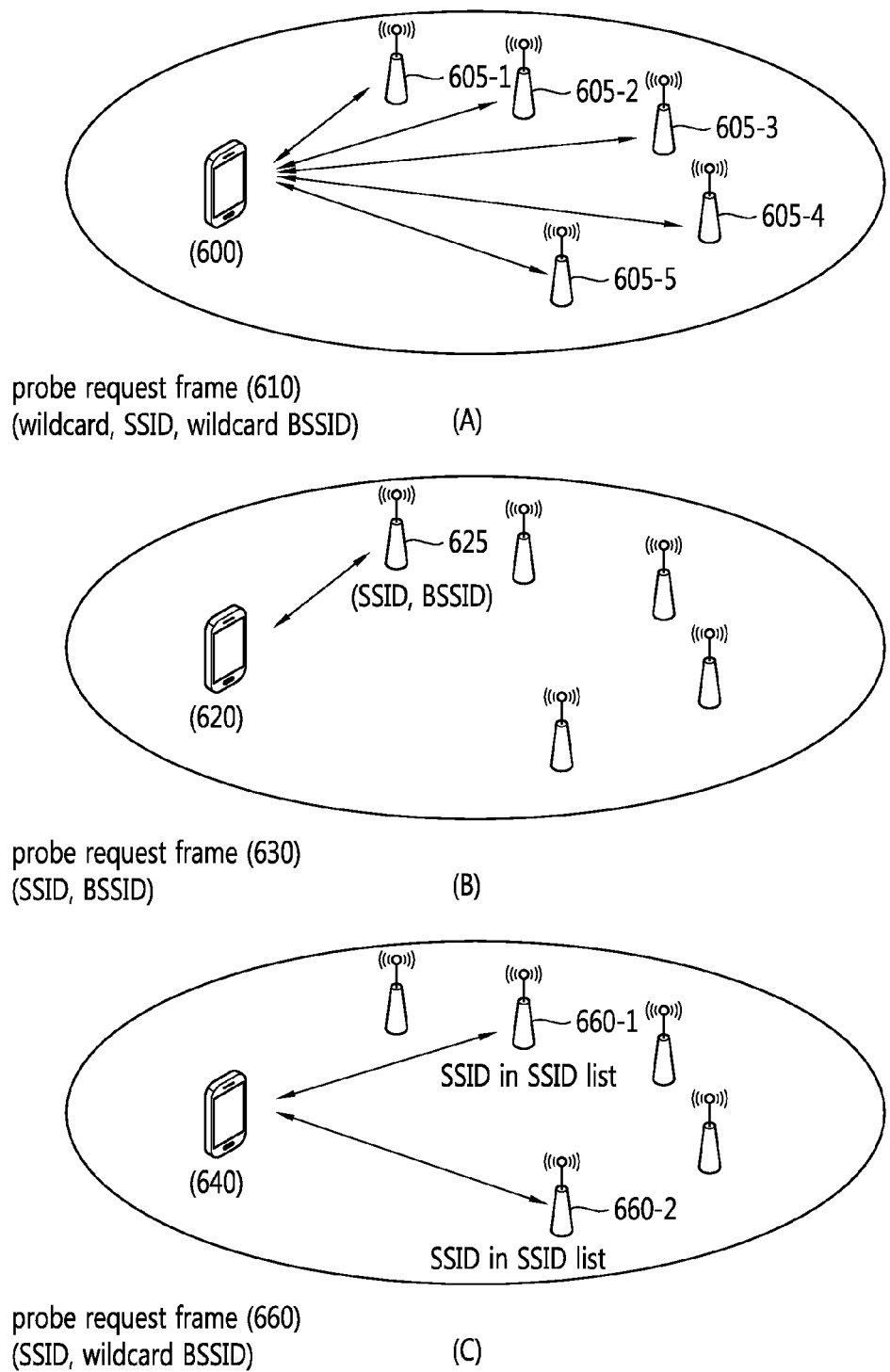
FIG. 6 is a concept view illustrating a probe request frame transmission method.

FIG. 6 is a concept view illustrating a probe request frame transmission method.

FIG. 6 discloses methods in which an STA broadcasts, multicasts, and unicasts a probe request frame.

FIG. 6(A) shows a method in which the STA 600 broadcasts the probe request frame 610.

The STA 600 may include a wildcard SSID and a wildcard BSSID in the probe request frame 610 and broadcast the probe request frame 610.

The wildcard SSID and the wildcard BSSID may be used as identifiers to indicate all of the APs 606-1, 606-2, 606-3, 606-4, and 606-6 included in the transmission range of the STA 600.

In case the STA 600 transmits the probe request frame 610 with the wildcard SSID and the wildcard BSSID included in the probe request frame 610, the APs 606-1, 606-2, 606-3, 606-4, and 606-6 that have received the probe request frame 610 from the STA 600 may send a probe response frame to the STA 600 in response to the received probe request frame.

In case the APs 606-1, 606-2, 606-3, 606-4, and 606-6 that have received the broadcast probe request frame 610 send the probe response frame to the STA 600 in response to the received probe request frame 610 within a constant time, the problem may occur that the STA 600 should receive and process too many probe response frames at once.

FIG. 6(B) shows a method in which the STA 620 unicasts the probe request frame 630.

Referring to FIG. 6(B), in case the STA 620 unicasts the probe request frame 630, the STA 620 may transmit the probe request frame 630 containing particular SSID/BSSID information of the AP. Among the APs that receive the probe request frame 630, only the AP 626 corresponding to the SSID/BSSID specified by the STA 620 may transmit a probe response frame to the STA 620.

FIG. 6(C) shows a method in which the STA 640 multicasts the probe request frame 660.

Referring to FIG. 6(C), the STA 640 may include an SSID list and a wildcard BSSID in the probe request frame 660 and transmit the same. Among the APs receiving the probe request frame 660, the APs 660-1 and 660-2 corresponding to the SSIDs included in the SSID list contained in the probe request frame may transmit a probe response frame to the STA 640.

According to an embodiment of the present invention, the STA may determine based on received beacon frame information whether the STA is to send a probe request frame.

As described above, in order for the STA to perform scanning, the MLME may receive MLME-SCAN.request primitive. MLME-SCAN.request primitive is a primitive created by the SME. MLME-SCAN.request primitive may be used to determine whether there is other BSS to which the STA is to be connected.

MLME-SCAN.request primitive may specifically contain information such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo. The details of MLME-SCAN.request primitive are set forth in IEEE Draft P802.11-REVmb™/D12, November 2011 'IEEE Standard for Information Technology Telecommunications and information exchange between systems— Local and metropolitan area networks—Specific requirements Part 11: Wireless LAN Medium Access Control (MAC) and Physical Layer (PHY) Specifications' 6.3.3.2 MLME-SCAN.request disclosed on November, 2011.

The following Table 1 briefly represents example information included in MLME-SCAN.request primitive.

TABLE 1

| name | description |
| --- | --- |
| BSSType | Determine whether infrastructure BSS, IBSS, MBSS(Mesh basic service set), or all, are included in the scan. |
| BSSID | Identifies a specific or wildcard BSSID. |
| SSID | Specifies the desired SSID or the wildcard SSID. |
| ScanType | Indicate either active or passive scanning |
| ProbeDelay | Delay(in a microseconds) to be used prior to transmitting a Probe frame during active scanning. |
| ChannelList | Specifies a list of channels that are examined when scanning for a BSS. |
| MinChannelTime | The minimum time(in TU) to spend on each channel when scanning. |
| MaxChannelTime | The maximum time(in TU) to spend on each channel when scanning. |
| RequirementInformation | This element is optionally present if dot11RadioMeasurementActivated is true and is placed in a Probe Request frame to request that the responding STA include the requested information in the Probe Response frame. |
| SSID List | On or more SSID elements that are optionally present when dot11MgmtOptionSSIDListActivated is true. |
| ChannelUsage | Specifies request types for the ChannelUsage request. |
| AccessNetworkType | Specifies a desired specific access networktype or the wildcard access network type |
| HESSID | Specifies the desired specific HESSID network identifier or the wildcard network identifier. This field is present when dot11InterworkingServiceActivated is true. |
| Mesh ID | Only present if BSS Type = MESH or BSSType = ANY_BSS. Specifies the desired Mesh ID or wildcard Mesh ID. |
| RequestParameter | The parameter define the responding STAs |
| ReportingOption | Indicates the result reporting mode |
| APConfigurationChangeCount | When a specific BSSID is indicated in the MLME-SCAN.request, the APConfigurationChangeCount associated with the stored configuration of the AP is optionally provided |
| VendorSpecificInfo | Optionally added information depend on vendor |

The request parameter included in MLME-SCAN.request primitive may be used to determine whether the responding STA is to transmit a probe response frame. The request parameter may contain information for requesting that other BSS's information be included in the probe response frame. Also, the request parameter may include a report request field, a delay criteria field, and a max delay limit field.

The report request field contains information to request that other BSS's information be included in the probe response frame, the delay criteria contains information on the delay type applied as a response to the probe request frame, and the max delay limit field may contain the maximum access delay information on the delay type indicated by the delay criteria field.

Besides, the request parameter may include a minimum data rate field and/or a received signal strength limit field. The minimum data rate field contains information on the lowest overall data rate in transmitting an MSDU or A-MSDU. The received signal strength limit field may further contain information on the limit value of the signal necessary for a recipient of the probe request frame to respond.

According to an embodiment of the present invention, in case ScanType of MLME-SCAN.request primitive received by the MLME of the STA is active scan and the STA receives the beacon frame transmitted from the AP, the STA might not transmit a probe request frame on the channel through which the beacon frame has been received. Among beacon frames, the frame including at least the same information as the information indicated by MLME-SCAN.request primitive to the STA may be denoted matched beacon frame. The matched beacon frame may be a frame whose information is similar to at least a portion of the information indicated by MLME-SCAN.request primitive to the STA.

For example, in case ScanType of received MLME-SCAN.request primitive is active scan, the STA may have as long a scan delay as indicated by the probe delay before transmitting the probe request frame. In case the transmission time of the AP's beacon frame comes back within the STA's probe delay time, the STA may receive the beacon frame. In case the beacon frame received by the STA is a matched beacon frame, the STA may perform the scanning procedure based on the received matched beacon frame without the need of performing active scanning based on MLME-SCAN.request primitive. In such case, the STA need not perform active scanning by transmitting a separate probe request frame to the AP. Accordingly, the STA may pause transmission of the probe request frame.

Among the beacon frames, the frame including at least the same information as the information indicated by MLME-SCAN.request primitive to the STA may be the matched beacon frame, and in other words, even when information matching a portion of the information that the STA is supposed to include in the probe request frame is contained in the beacon frame, the beacon frame may be the matched beacon frame.

The matched beacon frame may be a frame as follows, for example.

1) Beacon frame including the same information as the information included in the probe request frame that the STA is supposed to transmit. For example, the STA may generate a probe request frame including identifier information (for example, SSID, network ID and target BSSID, etc.) to specify the AP to which the probe request frame is to be transmitted. The identifier of the AP included in the beacon frame received by the STA may be equal to the identifier of the AP to which the STA is to transmit the probe request frame. Such beacon frame may be denoted a matched beacon frame. That is, upon reception of a beacon frame from a target AP to which the STA intended to send a probe request frame, the STA may determine that the received beacon frame is a matched beacon frame.

2) The STA may include identifier information and additional information in the probe request frame to specify the AP. The list including the identifier information and the additional information to specify the AP may be denoted a white list. The white list may include information, such as, e.g., SSID, BSSID, Mesh ID, HESSID( ), Network ID, Signal quality information), STA's QoS requirement information. The STA may include the white list in the probe request frame and send the same to the AP. When receiving the probe request frame, the AP may determine whether to transmit a probe response frame to the STA based on the white list. The AP satisfying the information included in the white list may transmit a probe response frame. That is, the white list may serve to filter an AP to transmit the probe response frame. According to an embodiment of the present invention, the STA may determine whether the beacon frame transmitted from the AP is a matched beacon frame based on the white list. For example, the STA may determine whether the beacon frame received from the AP is a matched beacon frame by comparing the AP's identification information and signal quality information of the beacon frame included in the beacon frame with the white list information. The white list is an example of reference information for the STA to determine whether to transmit a probe request frame.

Figure 7:
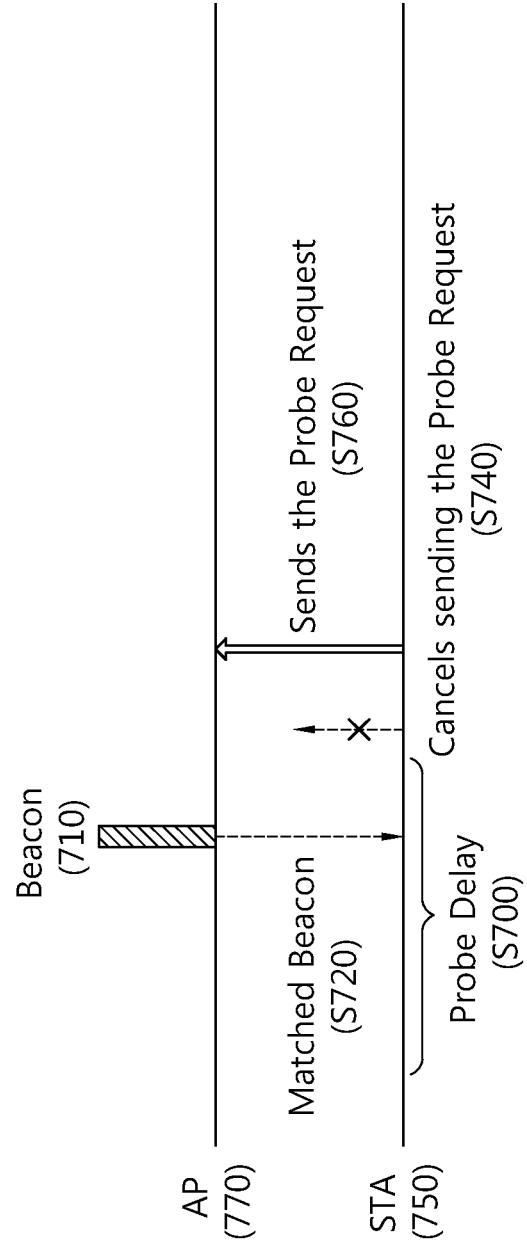
FIG. 7 is a concept view illustrating a scanning procedure by an STA according to an embodiment of the present invention.

FIG. 7 is a concept view illustrating a scanning procedure by an STA according to an embodiment of the present invention.

It is assumed in FIG. 7 that the STA is performing an active scanning procedure before transmitting a probe request frame. The STA may determine whether to transmit a probe request frame based on a received beacon frame. The STA that is performing the active scanning procedure before transmitting the probe request frame may be an STA that is positioned in a probe delay period in view of time.

Referring to FIG. 7, the STA 750 may monitor the beacon frame until the probe delay period expires (step S700).

The probe delay is a delay whose unit is ms before the STA 750 transmits the probe request frame. Within the probe delay period of the STA 750, the AP 770's beacon frame transmission timing may come back. In such case, the STA 750 may receive the beacon frame transmitted from the AP 770 within the probe delay period.

It is determined whether the received beacon frame is a matched beacon frame (step S720).

The STA 750 may determine whether the received beacon frame 710 is a matched beacon frame. The STA 750 may determine whether the received beacon frame 710 is a matched beacon frame based on the above-described matched beacon frame determining method. For example, it may be determined based on the MLME-SCAN.request primitive information and the information included in the beacon frame 710 whether the beacon frame is the matched beacon frame. For example, in case the AP's identifier information (for example, BSSID and SSID) included in MLME-SCAN.request primitive and the identifier information of the AP 770 that has transmitted the beacon frame 710 are the same, the STA 750 may determine that the beacon frame 710 is the matched beacon frame. Besides, the STA 750 may determine whether the beacon frame is the matched beacon frame based on the information included in the beacon frame 710 and the MLME-SCAN.request primitive information by various methods.

In case the beacon frame 710 is the matched beacon frame, the STA 750 does not transmit a probe request frame (step S740).

In case the beacon frame 710 received by the STA 750 is the matched beacon frame, the STA 750 might not transmit a probe request frame on the corresponding channel. The STA 750 may also perform an association procedure with the AP 770 based on a beacon frame that is received afterwards.

Unless the received beacon frame 710 is the matched beacon frame, the STA 750 transmits a probe request frame (step S760).

In case the beacon frame received by the STA 750 is the matched beacon frame, the STA 750 may transmit a probe request frame on the corresponding channel to perform an active scanning procedure. The STA 750, if thereafter receiving a probe response frame in response to the probe request frame, may associate itself with the AP 770 based on the probe response frame.

As described above, the STA, in case the STA receives the matched beacon frame, might not transmit the probe request frame. Further, in case the STA receives the matched probe request frame from other STA, the STA might not transmit the probe request frame. Hereinafter, the STA's operation when the STA receives the probe request frame from other STA is described.

The STA may receive the matched beacon frame while performing the active scanning procedure before transmitting the probe request frame, and may also receive a probe request frame broadcast from other STA. The probe request frame received by the STA may match the probe request frame that the STA intended to transmit.

Among the broadcast probe request frames, the frame that includes at least the same information as the information indicated by MLME-SCAN.request primitive to the STA may be denoted a matched probe request frame. The matched probe request frame may be a frame whose information is similar to at least a portion of the information indicated by MLME-SCAN.request primitive to the STA.

The matched probe request frame may be a probe request frame including the same information as the information included in the probe request frame that the STA is supposed to transmit. The matched probe request frame may be a frame as follows, for example.

1) Based on at least one information of the SSID, network ID, target BSSID, signal quality information, and STA's QoS request information that the STA intended to include in the probe request frame and information on the probe request frame received by the STA, the STA may determine that the received probe request frame is the matched probe request frame.

2) As another example, the STA may determine whether the received probe request frame is the matched probe request frame based on the white list used to filter the AP. The white list is an example of reference information for the STA to determine whether to transmit the probe request frame. That is, the STA may determine whether to transmit the probe request frame based on the reference information such as the white list.

In determining whether to transmit a probe request frame in the STA's active scanning procedure according to an embodiment of the present invention, the STA may determine whether the received frame is a beacon frame and whether the received frame is a matched probe response frame. The STA, in case the information included in the received probe response frame is the same as the information indicated based on MLME-SCAN.request primitive, may determine that the received probe response frame is the matched probe response frame.

Figure 8:
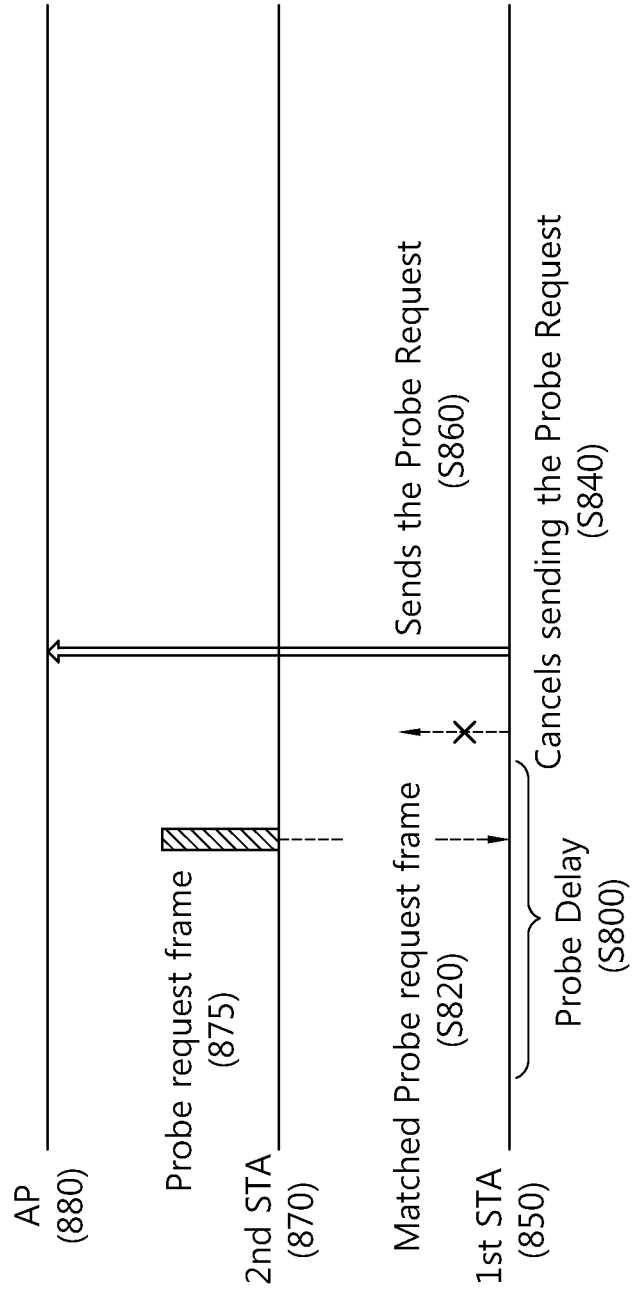
FIG. 8 is a concept view illustrating a scanning procedure by an STA according to an embodiment of the present invention.

FIG. 8 is a concept view illustrating a scanning procedure by an STA according to an embodiment of the present invention.

It is assumed in FIG. 8 that the STA is performing an active scanning procedure before transmitting a probe request frame. The STA may determine whether to transmit a probe request frame based on a received probe request frame. The STA that is in progress of the active scanning procedure before transmitting the probe request frame may be an STA positioned within a probe delay period in view of time.

Referring to FIG. 8, the first STA 850 may receive a probe request frame 875 transmitted from the second STA 870 in the probe delay period (step S800).

The first STA 850 may determine whether the received probe request frame 875 is a matched probe request frame to determine whether to transmit a separate probe request frame (step S820).

As described above, among the broadcast probe request frames, the frame including at least the same information as the information indicated by MLME-SCAN.request primitive to the STA may be denoted the matched probe request frame. For example, the first STA 850 may determine that the frame in which the information included in the received probe request frame is similar to at least a portion of the information indicated by MLME-SCAN.request primitive to the first STA 850 is the matched probe request frame.

For example, in case the AP's identifier information (for example, BSSID, SSID) included in the probe request frame 875 transmitted from the second STA 870 is the same as the AP's identifier information included in MLME-SCAN.request primitive, the first STA 850 may determine that the probe request frame 875 transmitted from the second STA 870 is the matched probe request frame.

In case the first STA 850 determines that the received probe request frame 875 is the matched probe request frame, the STA 850 might not transmit a probe request frame (step S840).

The STA 850 may determine that the received probe request frame 875 is the matched probe request frame. In such case, the STA 850 might not transmit the probe request frame in the active scanning procedure of the corresponding channel.

In case the STA 850 determines that the received probe request frame 875 is a non-matched probe request frame, the STA 850 may transmit the probe request frame (step S860).

The STA 850 may determine that the received probe request frame is the non-matched probe request frame. In such case, the STA 850 may perform the active scanning procedure to transmit the probe request frame.

The STA 850 may additionally include in the probe request frame the information indicating that the STA 850 has received the probe request frame from other STA (for example, the second STA 870) upon transmission of the probe request frame and transmit the same. For example, the field including the information indicating that the STA has received a probe request frame from other STA may be denoted a signal detection field. The STA, when receiving the probe request frame from other STA, may include the signal detection field in the probe request frame and transmit the same.

The signal detection field, not only when the probe request frame transmitted from other STA is received by the STA, but also when the STA receives other frame or signal, a frame detection field may be included in the probe request frame and may be transmitted. For example, the other frame and the external signal may be a non-matched beacon frame, non-matched probe request frame, probe response frame transmitted from the AP, other MAC frame or physical layer signal or other various frames and/or signals.

For example, in case the STA receives the external signal within the probe delay period, the STA may receive the probe response frame from the AP with the probe timer set as the maximum channel time (MaxchannelTime). The AP, in case there is an external signal detection field of the probe request frame transmitted from the STA, may be aware that the probe timer receiving the probe response frame from the STA is set as the maximum channel time. The AP may transmit the probe response frame to the STA within the maximum channel time.

Figure 9:
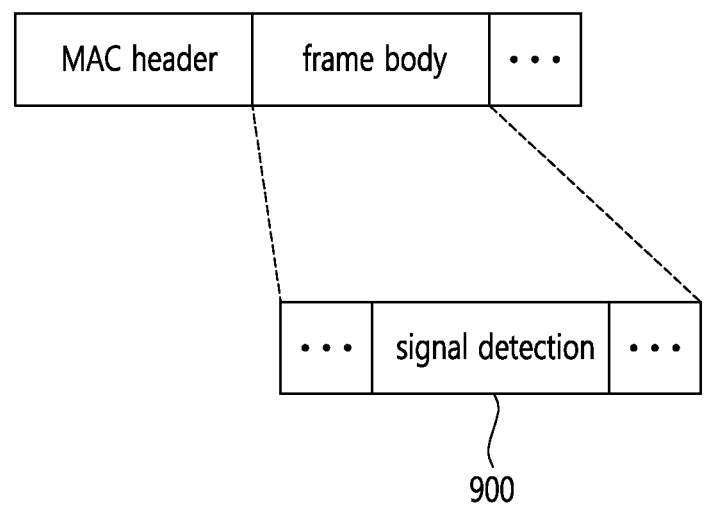
FIG. 9 is a concept view illustrating a probe request frame according to an embodiment of the present invention.

FIG. 9 is a concept view illustrating a probe request frame according to an embodiment of the present invention.

FIG. 9 discloses a probe request frame including a signal detection field 900.

The signal detection field 900 may be included in the frame body of the probe request frame to indicate that the STA that has transmitted the probe request frame has received other frame or signal while performing an active scanning procedure before transmitting the probe request frame.

The signal detection field 900 may be information additionally included in the frame body of the probe request frame in case the STA receives other frame or signal while performing the active scanning procedure before transmitting the probe request frame. As another example, the signal detection field, as flag information, may indicate as 0 or 1 whether other frame or signal has been received while the active scanning procedure is ongoing. That is, the signal detection field 900 may be implemented in various formats.

According to an embodiment of the present invention, even when the STA receives a matched probe request frame, the STA may transmit a probe request frame. In such case, the probe request frame transmitted from the STA may be a simplified probe request frame. The simplified probe request frame may be a frame including only a portion of the information included in the probe request frame.

Figure 10:
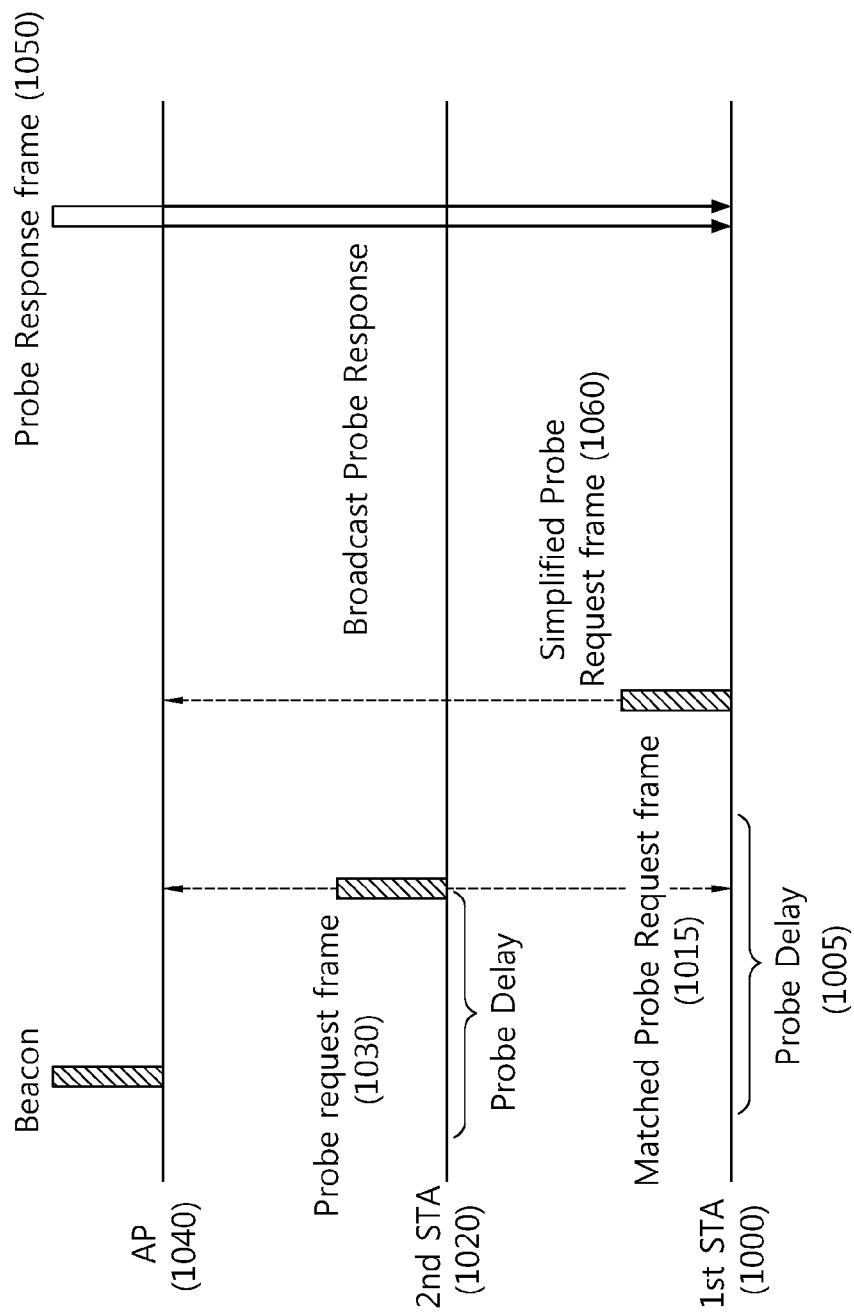
FIG. 10 is a concept view illustrating a probe request frame transmitting method according to an embodiment of the present invention.

FIG. 10 is a concept view illustrating a probe request frame transmitting method according to an embodiment of the present invention.

Referring to FIG. 10, the first STA 1000 may overhear the probe request frame 1030 transmitted from the second STA 1020.

For example, the first STA 1000 may receive the probe request frame broadcast from the second STA 1020 in the probe delay 1005.

In case the first STA 1000 receives the probe request frame transmitted from the second STA 1020 in the probe delay 1005, the first STA 1000 may determine whether the received probe request frame 1030 is a matched probe request frame 1015.

In case the probe request frame 1030 received by the first STA 1000 is the matched probe request frame 1015, the first STA 1000 may transmit a simplified probe request frame 1060. The simplified probe request frame 1060 may be, e.g., a frame including the identifier information (for example, STA's MAC address) of the STA 1000 that has transmitted the probe request frame 1060. The identifier information of the STA 1000, which is information included in the simplified probe request frame 1060, is an example, and other information may be included in the simplified probe request frame 1060. For example, the information included in the simplified probe request frame 1060 may vary depending on the information on the probe request frame 1030 received by the STA 1000. Based on the probe request frame 1030 received by the STA 1000, information to be additionally transmitted to the AP 1040 may be determined, and the frame including only the information to be additionally transmitted may be referred to as the simplified probe request frame 1060. As another example, the probe request frame 1030 received by the STA 1000 may be compared with the information that the STA 1000 intended to include in the probe request frame, and the frame including only different information, with the same information excluded, may be the simplified probe request frame 1060. That is, the simplified probe request frame 1060 may have various forms depending on implementations, which also belong to the scope of the present invention.

In case the probe request frame 1030 received by the first STA 1000 is not the matched probe request frame 1015, a probe request frame including the full information may be transmitted.

The AP 1040 may receive the probe request frame 1030 transmitted from the second STA 1020 and the simplified probe request frame 1060 transmitted from the first STA 1000. The AP 1040, when transmitting responses to the probe request frames 1030 and 1060, may broadcast a probe response frame 1050 to the first STA 1000 and the second STA 1020. That is, without the need of separately transmitting probe response frames to the first STA 1000 and the second STA 1020, respectively, the AP 1040 may transmit the probe response frame 1050 to the two STAs 1000 and 1020 in a broadcast manner. For example, in case the probe request frame 1030 transmitted from the plurality of STAs 1000 and 1020 and the simplified probe request frame 1060 do not contain individual request information, the AP 1040 may broadcast the probe response frame 1050. In case the probe request frame 1030 and the simplified probe request frame 1060 do not contain individual request information, the AP 1040 need not unicast individual probe response frames to the STAs 1000 and 1020, respectively, and may thus broadcast the probe response frame 1050. Such method of transmitting the probe response frame 1050 by the AP 1040 is merely an embodiment, and even when the probe request frames 1030 and 1060 respectively transmitted from the plurality of STAs 1000 and 1020 contain individual request information depending on the AP 1040's determination, in case the same information is to be transmitted to the plurality of STAs 1000 and 1020, the probe response frame 1050 may be broadcast. Further, even when different information is to be transmitted from the AP 1040 to the plurality of 1000 and 1020, the probe response frame 1050 may be broadcast depending on the AP 1040's determination.

Figure 11:
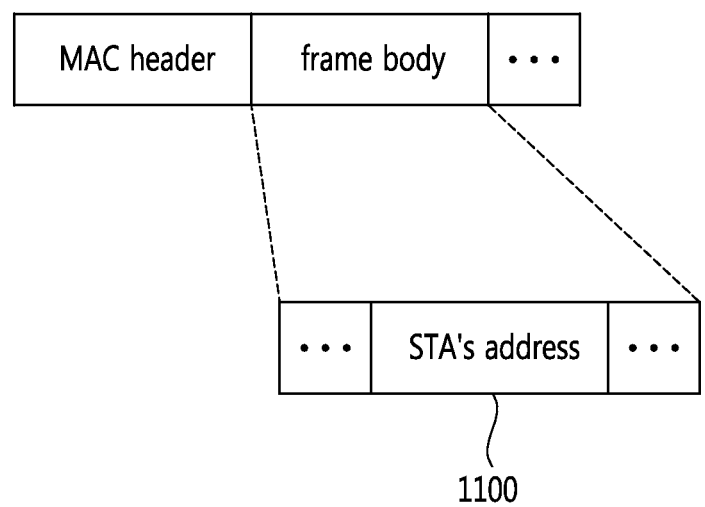
FIG. 11 is a concept view illustrating a simplified probe request frame according to an embodiment of the present invention.

FIG. 11 is a concept view illustrating a simplified probe request frame according to an embodiment of the present invention.

FIG. 11 illustrates an example in which as an example of the simplified probe request frame, the address of the STA transmitting the simplified probe request frame is included in the frame body and is sent. The STA address field 1100 may contain the address of the STA (for example, MAC address) that receives a matched probe request frame from other STA and transmits the simplified probe request frame. As described above, the simplified probe request frame may have various formats.

According to another embodiment of the present invention, in case the STA receives the probe request frame from other STA, it may determine whether the received probe request frame includes a probe request frame detection field to determine whether to transmit the probe request frame. The probe request frame detection field may indicate whether the STA has received the probe request frame from other STA in the active scanning procedure. The probe request frame detection field may have various data formats.

For example, the probe request frame detection field may be flag information. In case the probe request frame is received from other STA, the probe request frame detection field may have a value '1.' In contrast, unless the probe request frame is received from other STA, the probe request frame detection field may have a value '0.' As another example, in case the probe request frame is received from other STA, the probe request frame including the probe request frame detection field may be transmitted, and unless the probe request frame is received from other STA, the probe request frame not including the probe request frame detection field may be transmitted. Besides, the information indicating whether the STA has received the probe request frame from other STA may be included and transmitted by other various methods.

Hereinafter, according to an embodiment of the present invention, in case the probe request frame transmitted from other STA is received, it is assumed for ease of description that the probe request frame is generated with the probe request frame detection field included in the probe request frame. In contrast, unless the STA receives the probe request frame transmitted from other STA, it is assumed that the probe request frame is generated with no probe request frame detection field included in the probe request frame. For example, the STA, in case the STA receives the probe request frame from other STA in the probe delay period before transmitting the probe request frame in the active scanning procedure, may include the probe request frame detection field in the probe request frame and transmit the same.

Figure 12:
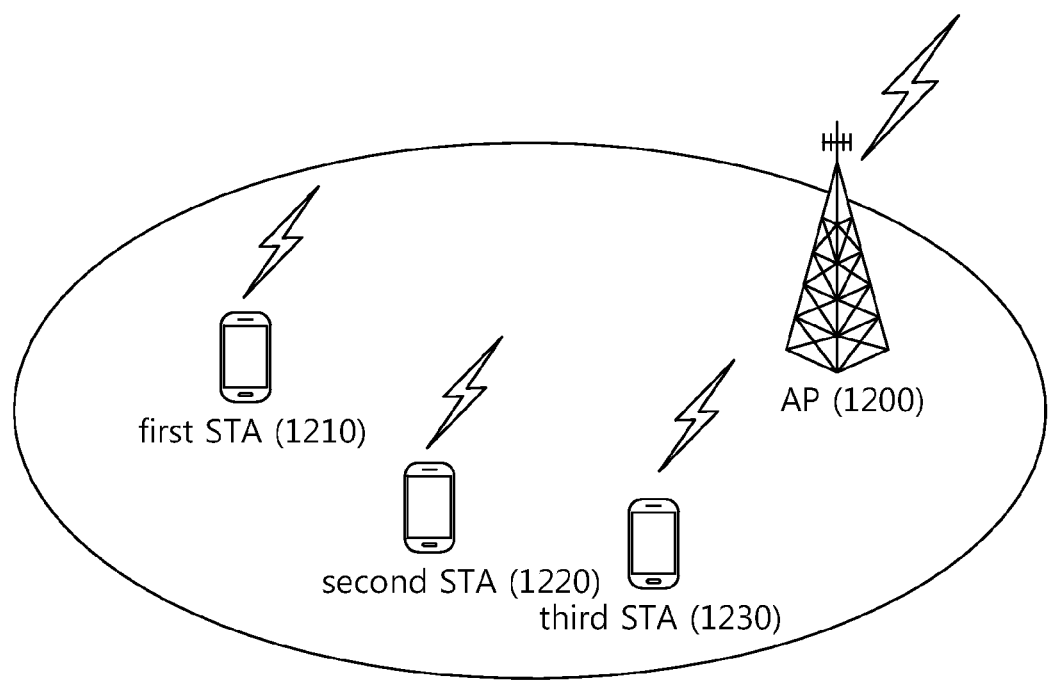
FIG. 12 is a concept view illustrating a method of determining whether to transmit a probe request frame according to an embodiment of the present invention.

FIG. 12 is a concept view illustrating a method of determining whether to transmit a probe request frame according to an embodiment of the present invention.

It is assumed in FIG. 12 that the STA is performing an active scanning procedure before transmitting the probe request frame. The STA that is in progress of the active scanning procedure before transmitting the probe request frame may be an STA that is positioned within a probe delay period in view of time. The STA may receive a probe request frame transmitted from other STA in the probe delay period. The STA, in case the received probe request frame is a matched probe request frame, may determine whether there is a probe request frame detection field included in the received probe request frame. Based on the result of determining whether there is the probe request frame detection field, whether the STA transmits the probe request frame and whether the probe request frame includes the probe request frame detection field may be determined.

Hereinafter, it may be assumed according to an embodiment of the present invention that the probe request frame received by the first STA 1210 is a matched probe request frame. Unless the probe request frame received by the first STA 1210 is the matched probe request frame, an individual probe request frame may be generated by the first STA 1210 and may be transmitted.

Referring to FIG. 12, the first STA 1210 may determine information in the probe request frame detection field included in the probe request frame received from other STA in order to determine whether to transmit the probe request frame and whether to include the probe request frame detection field in the probe request frame.

The first STA 1210 may receive the matched probe request frame transmitted from the second STA 1220. The first STA 1210 may determine whether the probe request frame transmitted from the second STA 1220 includes the probe request frame detection field.

The second STA 1220 may transmit the probe request frame to the first STA 1210 in the following cases.

1) In case the second STA 1220 receives the matched probe request frame from other STA, a third STA 1230, and the probe request frame transmitted from the third STA 1230 does not contain the probe request frame detection field, the second STA 1220 may include the probe request frame detection field in the probe request frame and transmit the generated probe request frame.

2) In case the second STA 1220 receives a non-matched probe request frame from other STA, the third STA 1230, the second STA 1220 may transmit the probe request frame not including the probe request frame detection field.

3) In case the second STA 1220 does not receive the probe request frame from other STA, the third STA 1230, the second STA 1220 may transmit the probe request frame not including the probe request frame detection field.

That is, the second STA 1220, only when the second STA 1220 receives the matched probe request frame from other STA, the third STA 1230, and the probe request frame transmitted from the third STA 1230 does not contain the probe request frame detection field, may include the probe request frame detection field in the probe request frame to be transmitted and transmit the same.

The first STA 1210 may determine, as follows, whether to transmit the probe request frame based on whether the matched probe request frame transmitted from the second STA 1220 includes the probe request frame detection field.

1) In case the probe request frame transmitted from the second STA 1220 contains the probe request frame detection field In such case, the first STA 1210 might not transmit a separate probe request frame. In view of the AP 1200, the matched probe request frames have been received from two different STAs (second STA 1220 and third STA 1230). The AP 1200, for example when the received probe request frame has the probe request frame detection field, may broadcast a probe response frame. The first STA 1210 may receive the probe response frame broadcast from the AP 1200 even without transmitting a separate probe request frame.

2) In case the probe request frame transmitted from the second STA 1220 does not contain the probe request frame detection field In such case, the first STA 1210 may transmit a separate probe request frame. The first STA 1210 may include the probe request frame detection field in the probe request frame to be sent and may transmit the same. The AP 1200 may receive probe request frames from the first STA 1210 and the second STA 1220. The AP 1210 may broadcast a probe response frame since the probe request frame transmitted from the first STA 1210 has the probe request frame detection field, for example.

Figure 13:
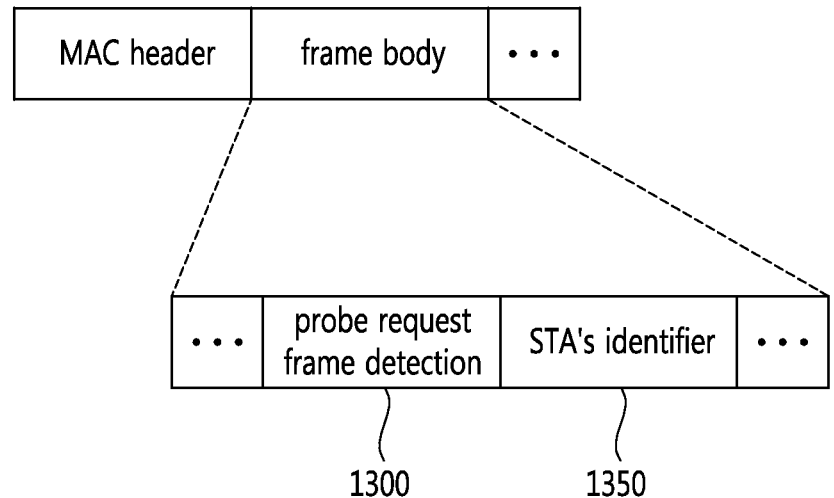
FIG. 13 is a concept view illustrating a probe request frame according to an embodiment of the present invention.

FIG. 13 is a concept view illustrating a probe request frame according to an embodiment of the present invention.

Referring to FIG. 13, the frame body of the probe request frame may include the identifier information (for example, MAC address, 1350) of the STA transmitting a probe request frame and a probe request frame detection field 1300.

As described above, in case the STA receives a matched probe request frame from other STA while the received probe request frame does not include the probe request frame detection field 1300, the STA may transmit a probe request frame including the probe request frame detection field 1300 and the STA's identifier information 1350. The probe request frame including the probe request frame detection field 1300, which is transmitted from the STA, may be generated in a simplified form. The simplified probe request frame may be a frame including only a portion of the information included in the probe request frame. For example, the STA, in the case of the same information based on the matched probe request frame, may generate and transmit a probe request frame with the information excluded from the probe request frame.

According to an embodiment of the present invention, the AP may broadcast the probe response frame as described above. Or, in case the timing for transmitting a beacon frame comes back at the timing for transmitting a probe response frame, the AP may transmit only the beacon frame without broadcasting the probe response frame. According to an implementation, the AP may transmit various frames as well as the probe response frame for the STA's scanning operation. For example, the AP may conduct a scanning procedure with the STA by transmitting various frames, such as the probe response frame, beacon frame, measurement pilot frame, FILS (fast initial link setup) beacon frame or the like. Such frames are defined and used as the response frame.

The AP may transmit only the response frame including the full information (for example, full information probe response frame). The response frame including the full information means a frame including all inevitable information. However, in another embodiment, the frame including information on the timing when the AP is to transmit a response frame including the full information before transmitting the response frame may be transmitted before the response frame is transmitted to the STA.

Figure 14:
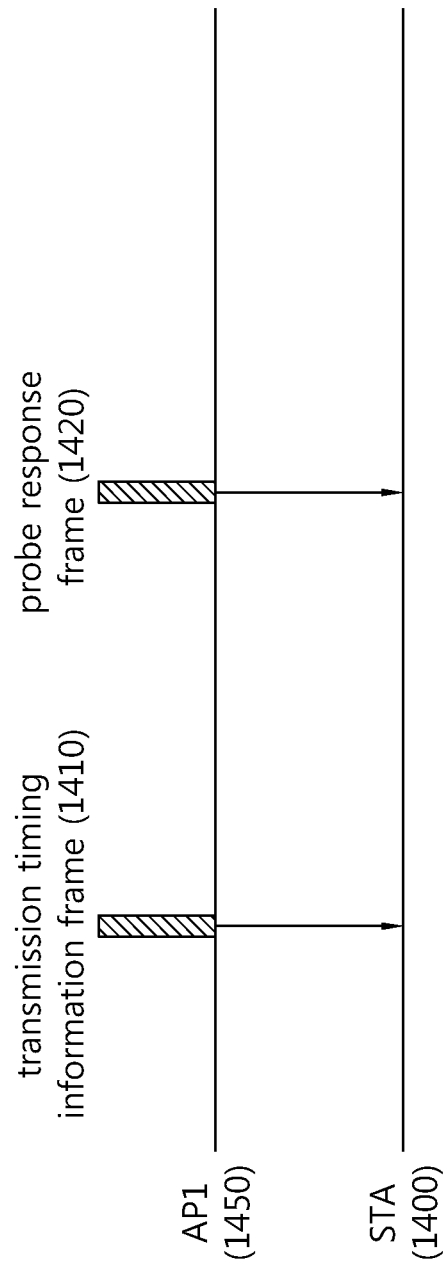
FIG. 14 is a concept view illustrating a method of transmitting a probe response frame from an AP to an STA according to an embodiment of the present invention.

FIG. 14 is a concept view illustrating a method of transmitting a probe response frame from an AP to an STA according to an embodiment of the present invention.

FIG. 14 discloses a method of transmitting a response frame responsive to a plurality of probe request frames transmitted from the AP 1450. The response frame may be a frame transmitted from the AP 1450 in order to perform scanning between the STA 1400 and the AP. For ease of description, it is assumed in FIG. 14 that the response frame is a probe response frame.

The AP 1450 may transmit a frame 1410 including information on the timing of broadcasting the response frame to the STA 1400 before transmitting the probe response frame 1420 including the full information. The frame including the information on the timing of broadcasting the response frame before transmitting the response frame is denoted a transmission timing information frame 1410.

The STA 1400 may obtain the information on the timing of transmitting the probe response frame 1420 from the AP 1450 based on the transmission timing information frame 1410 transmitted from the AP 1450. The STA 1400 may receive the probe response frame 1420 transmitted from the AP 1450 based on the obtained probe response frame transmission timing information.

Figure 15:
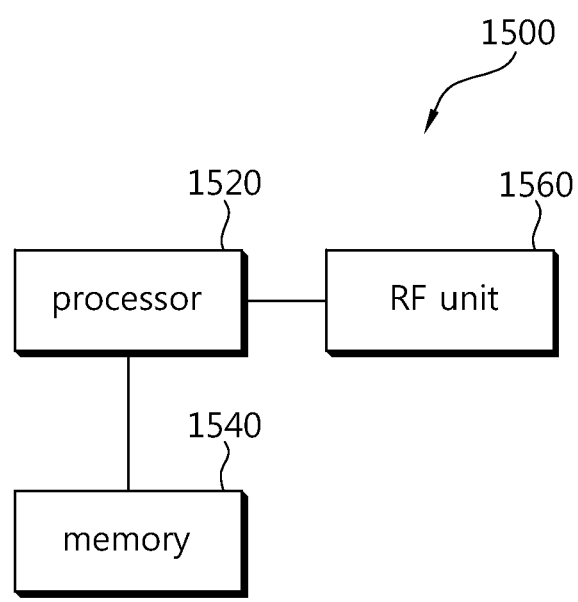
FIG. 15 is a block diagram illustrating a wireless device to which an embodiment of the present invention may apply.

FIG. 15 is a block diagram illustrating a wireless device to which an embodiment of the present invention may apply.

Referring to FIG. 15, the wireless device 1500 is an STA that may implement the above-described embodiments and may be an AP or a non-AP STA (station).

The wireless device 1500 includes a processor 1520, a memory 1540, and an RF (radio frequency) unit 1560.

The RF unit 1560 may be connected with the processor 1520 to transmit/receive radio signals.

The processor 1520 implements functions, processes, and/or methods as proposed herein. For example, the processor 1520 may be implemented to perform the operation of the wireless device according to the above-described embodiments of the present invention.

For example, in case the scanning station generates scan request information indicating active scanning, determines the scanning frame received from a station, and the received scanning frame does not include even at least one element equal to the element indicated by the scan request information, the processor 1520 may be implemented so that the scanning station transmits a probe request frame for performing the active scanning.

The processor 1520 may include an ASIC (application-specific integrated circuit), other chipset, a logic circuit, a data processing apparatus, and/or a converter that converts a baseband signal and a radio signal therebetween. The memory 1540 may include an ROM (read-only memory), an RAM (random access memory), a flash memory, a memory card, a storage medium, and/or other storage device. The RF unit 1560 may include one or more antennas that transmit and/or receive radio signals.

When an embodiment is implemented in software, the above-described schemes may be embodied in modules (processes, functions, etc.) that perform the above-described functions. The modules may be stored in the memory 1540 and may be executed by the processor 1520. The memory 1540 may be positioned in or outside the processor 1520 and may be connected with the processor 1520 by way of a well-known means.

What is claimed is:

1. A method of performing scanning in a wireless LAN system, the method comprising:
generating, by a scanning station, scan request information to indicate active scanning;
waiting, by the scanning station, until probe delay time indicated by the scan request information expires or an indication primitive indicating a physical layer of the scanning station has successfully received a valid physical layer header of a new physical protocol data unit (PPDU) is received at a medium access control (MAC) layer of the scanning station; and
upon waiting, determining, by the scanning station, whether to transmit a probe request frame by checking whether a broadcast addressed probe request frame received at the scanning station identifies an access point (AP) which the scanning station considers a suitable candidate for association,
wherein the scanning station does not transmit the probe request frame if the broadcast addressed probe request frame identifies the access point (AP).

2. The method of claim 1,
wherein the scan request information includes at least one of:
a basic service set identifier (BSSID) element indicating a specific BSSID or a wild card BSSID;
a service set identifier (SSID) element indicating a required SSID or a wild card SSID; and
a request parameter element used by a responding station to determine whether to transmit a probe response frame in response to the probe request frame.

3. The method of claim 2, wherein the request parameter element includes:
a report request field indicating information of other BSSs requested to be included in the probe response frame;
a delay criteria field indicating a delay type that is applied to a respond to the probe request frame; and
a max delay limit field indicating a maximum access delay in the delay type indicated by the delay criteria field.

4. A wireless scanning station in a wireless LAN system, the station comprising:
a radio frequency (RF) unit that transmits and receives radio signals; and
a processor, connected with the RF unit, that:
generates scan request information to indicate active scanning;
waits until a probe delay time indicated by the scan request information expires or an indication primitive indicating a physical layer of the scanning station has successfully received a valid physical layer header of a new physical protocol data unit (PPDU) is received at a medium access control (MAC) layer of the scanning station; and
upon waiting, determines whether to transmit a probe request frame by checking whether a broadcast addressed probe request frame received at the scanning station identifies an access point (AP) which the scanning station considers a suitable candidate for association, wherein the scanning station does not transmit the probe request frame if the broadcast addressed probe request frame identifies the access point (AP).

5. The wireless device of claim 4, wherein the scan request information includes at least one of:
   a basic service set identifier (BSSID) element indicating a specific BSSID or a wild card BSSID;
   a service set identifier (SSID) element indicating a required SSID or a wild card SSID; and
   a request parameter element used by a responding station to determine whether to transmit a probe response frame in response to the probe request frame.

6. The wireless device of claim 5, wherein the request parameter element includes:
   a report request field indicating information of other BSS requested to be included in the probe response frame;
   a delay criteria field indicating a delay type that applies to a response to the probe request frame; and
   a max delay limit field indicating a maximum access delay in the delay type indicated by the delay criteria field.

* * * * *